(12) United States Patent
Zhao et al.

(10) Patent No.: US 11,743,130 B2
(45) Date of Patent: Aug. 29, 2023

(54) SMART EDGE NETWORK MANAGEMENT

(71) Applicant: International Business Machines Corporation, Armonk, NY (US)

(72) Inventors: Wen Rui Zhao, Beijing (CN); Jing Bo Jiang, Beijing (CN); Lan Luo, Beijing (CN); Li Ni Zhang, Beijing (CN); Yu Zhao, Beijing (CN); Li Jiang, Beijing (CN); Li Long Chen, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 31 days.

(21) Appl. No.: 16/412,751

(22) Filed: May 15, 2019

(65) Prior Publication Data

US 2020/0366561 A1    Nov. 19, 2020

(51) Int. Cl.
*H04L 41/12* (2022.01)
*H04L 67/30* (2022.01)
*H04L 67/10* (2022.01)

(52) U.S. Cl.
CPC .............. *H04L 41/12* (2013.01); *H04L 67/30* (2013.01); *H04L 67/10* (2013.01)

(58) Field of Classification Search
CPC ......... H04L 41/12; H04L 67/30; H04L 67/10; H04L 67/02; H04L 29/06; H04L 69/329; H04L 29/06027; H04L 51/04; H04L 65/4092; H04L 67/306; G06Q 30/0269; G06Q 30/02; G06Q 30/0273; H04N 21/25891; H04N 21/8545; H04N 21/41407; H04N 21/4532; H04N 21/47202; H04N 21/643; H04N 21/812; H04N 21/2668; H04N 21/437; H04N 21/632

See application file for complete search history.

(56) References Cited

U.S. PATENT DOCUMENTS

| | | | |
|---|---|---|---|
| 9,854,058 B2* | 12/2017 | Gorti | H04L 67/306 |
| 10,198,524 B1* | 2/2019 | Amalapurapu | G06F 16/958 |
| 2004/0143513 A1 | 7/2004 | Aleles et al. | |
| 2006/0112079 A1* | 5/2006 | Holt | G06F 16/9535 |
| 2011/0060905 A1* | 3/2011 | Stack | G06Q 30/02 713/167 |
| 2012/0310732 A1* | 12/2012 | Heiser, II | G06Q 30/02 705/14.45 |
| 2013/0031187 A1* | 1/2013 | Rajesh | H04L 67/327 709/206 |

(Continued)

FOREIGN PATENT DOCUMENTS

CN    103338223 A    10/2013

OTHER PUBLICATIONS

Mell et al., "The NIST Definition of Cloud Computing", Recommendations of the National Institute of Standards and Technology, Special Publication 800-145, Sep. 2011, 7 pages.

(Continued)

*Primary Examiner* — Mohamed A. Wasel
*Assistant Examiner* — Zonghua Du
(74) *Attorney, Agent, or Firm* — David K. Mattheis (57) ABSTRACT

Managing network interactions by engaging a networked information broadcast service, receiving information from the networked information broadcast service, filtering the information according to a profile, and sending information according to the filtered information using another network communications connection.

14 Claims, 6 Drawing Sheets

(56) References Cited

U.S. PATENT DOCUMENTS

| | | | |
|---|---|---|---|
| 2013/0235027 A1* | 9/2013 | Sharifi | G09B 29/006 |
| | | | 345/418 |
| 2013/0246216 A1* | 9/2013 | Chau | G06Q 50/12 |
| | | | 705/26.7 |
| 2014/0164126 A1* | 6/2014 | Nicholas | G06Q 30/08 |
| | | | 705/14.58 |
| 2014/0316886 A1* | 10/2014 | Smith | G06Q 30/0257 |
| | | | 705/14.49 |
| 2015/0112826 A1 | 4/2015 | Crutchfield, Jr. | |
| 2015/0161649 A1* | 6/2015 | Eggleston | G06Q 30/0236 |
| | | | 705/14.36 |
| 2015/0262245 A1* | 9/2015 | Arvanitis | G06Q 30/0269 |
| | | | 705/14.35 |
| 2015/0269152 A1 | 9/2015 | Rekhi et al. | |
| 2015/0331948 A1* | 11/2015 | Arning | G06F 16/248 |
| | | | 707/706 |
| 2016/0014227 A1* | 1/2016 | Steinberg | H04L 67/306 |
| | | | 709/204 |
| 2016/0092960 A1 | 3/2016 | Deshpande et al. | |
| 2016/0253710 A1* | 9/2016 | Publicover | H04N 21/25883 |
| | | | 705/14.66 |
| 2017/0255988 A1* | 9/2017 | Calio | G06Q 30/0261 |
| 2017/0300999 A1 | 10/2017 | Wilkinson et al. | |
| 2017/0372401 A1 | 12/2017 | Wang et al. | |
| 2018/0234796 A1* | 8/2018 | Saha | H04W 4/023 |

OTHER PUBLICATIONS

Mienon, Lekha, "Immersive Retail Experiences Powered by the Edge", TCS50, TATA Consultancy Services, Jan. 10, 2019, 8 pages, <https://www.tcs.com/blogs/immersive-retail-experiences-powered-by-the-edge>.

* cited by examiner

SMART EDGE NETWORK MANAGEMENT

BACKGROUND

The disclosure relates generally to managing network connections for application execution. The disclosure relates particularly to managing network connections while securing data.

Customized service can be provided to a user according to a defined categorization. The defined categorization can be developed and maintained by a service provider. The user may establish a categorization and allow providers access to data and permit analysis of the categorization information. Interactions may be tracked using identification means. The service provider may analyze all the data associated with the interactions.

SUMMARY

Aspects of the invention disclose methods, systems and computer readable media associated with managing network connection by engaging a networked information broadcast service, receiving information from the networked information broadcast service, filtering the information according to a profile, and sending information according to the filtered information using another network communications connection.

DETAILED DESCRIPTION

Interacting with outside parties over a network frequently involves providing a user's information in exchange for information from the provider. Connecting to multiple outside parties can involve sharing user information with each party, placing the user information at risk with each interaction. In many instances, the user information is shared in exchange for information which turns out to be of no value to the user, e.g., the user is not interested in the information nonce it is received as it is not what the user thought it would be, or it relates to a product or offer in which the user is not interested after learning the details. The user would benefit from an ability to manage the network interactions such that information could be received without the necessity of providing personal information in exchange.

Personalized interactions using connected devices offer the possibility of a tailored experience. A user can register for a service, create an account, identify themselves, and receive individualized treatment from a provider. The services are typically limited to the offerings of a single provider. Engaging other providers requires additional accounts, each connecting the user to a single provider. Identifying information may be placed at risk and lost due to a data breach. Ongoing personalized service requires some means of identifying the individual consumer and associating the user with an interaction.

Analyzing the information from a series of interactions can produce valuable data and insights. Storing and analyzing the data can require computational resources beyond the capacity of a typical user device. Control of the data and insights may reside with the provider rather than the user, raising the questions regarding ownership and control of data. What is needed is a method for providing a custom output without giving up control of information, either PII (personally identifying information) or other data.

The edge cloud provides a decentralized mechanism to offer users computing resources and capabilities beyond those of their mobile device. A personal edge cloud provides an opportunity to store and process data without giving up control over the data. Use of edge cloud resources provides the user additional capacity to perform data analytics on their data across multiple user experiences with different providers. The edge cloud also reduces performance latency issues as the resources tend to be closer to the user's location.

Edge cloud resources are locally available network resources accessible by user devices using wireless and wired connections. Users can increase available computing resources by running user applications using edge cloud resources. Users typically do not own the edge cloud resources but do control the applications running on the resources and the data processed and stored there.

In an embodiment, a user's mobile device runs an application. The device can be a smart phone, tablet, or computer. The application connects the device to a personal edge cloud system where additional resources are utilized to provide a more complete experience. The edge cloud can include a number of functional modules, each connected to a common database containing user data. A history-feedback module can store and analyze user interactions over time. Interactions with multiple goods and services providers can be stored and analyzed in this module. Preferred providers, goods, and services can be tracked. Consumption habits and preferences can also be tracked. All user data can remain in the user's personal edge cloud.

A connection module can be used to track active provider connections and to pull information from providers according to provider proximity, a user profile including user preferences, current needs lists, etc. In an embodiment, information regarding connections can be passed from the user's device to the edge cloud. The information can include connection details and a virtual location from which a provider's catalog offerings can be retrieved, allowing the edge cloud resources to retrieve the catalog items directly. In an embodiment, the information includes the connection details and the relevant catalog offerings retrieved by the device.

The information can be retained by the edge resources as part of the connection module, for future access when the catalog becomes relevant. Relevance can depend upon the user profile including: needs list items, user preferences, as well as the user's location. Catalog item information can be retained by the history—feedback module and an analysis—filter modules to track provider's offerings over time.

The user's device can connect the broadcast services by visiting an address provided in a WIFI link, a QR code, or an nfc tag. The provider allows all connected visitors access to pull information from their current offerings catalog anonymously. No user information is given to the provider to enable pulling offering information. (Note: the term(s)

"WIFI" may be subject to trademark rights in various jurisdictions throughout the world and are used here only in reference to the products or services properly denominated by the marks to the extent that such trademark rights may exist.)

In an embodiment, the user receives, or creates, a user identification when they install the application on their device. This identification is then passed to the provider whenever they pull information from the provider's system. The identification allows the provider to verify with the application provider that the current user is a valid application user. In this embodiment, the provider tracks offering pulls by application users and can track the frequency of pulls by each individual user. User application identification information is not linked to a user account with a provider.

In an embodiment, each user of the application is provided the same tag, identifying them as an application user. In this embodiment, the providers can track the extent to which application users take advantage of their system but cannot track individual users. The provider can associate their sales activity with application users in the aggregate but not at the individual user level. In an embodiment, the provider may direct marketing at application users, making special offers to current users of the application for specific time frames.

Once a user has connected to the service offerings of a provider, the connection module can track the availability of the provider's offering catalog. As the catalog becomes relevant, offerings are pulled according to the user's profile including: user's history, current needs list, current web browsing content, and user preferences. One user preference may relate to the location of the user relative to the provider (for example, pull offerings for providers within one mile of my location).

The analysis—filter module can be used to process information pulled by the connection module. In an embodiment, the analysis—filter module filters offerings against a user profile including: current needs list entries, past selections by the user in view of the current offerings, user preferences for the items being considered and user history with the providers being considered. The module can consider the history of the user across a category of providers rather than history with only a single provider.

A recommendation module receives data from the analysis—filter module and ranks the current offerings according to available factors such as price, a user profile including user preferences, provider, offering details, available internet reviews and rankings, and user history. Recommendations are then passed from the edge cloud to the user's device for display to the user.

As an example, a user considering a new jacket may learn that a local retailer has a highly ranked jacket in the user's preferred color and size at a favorable price. As a second example, a user may learn that a user's favorite local restaurant, based upon the user's history, has an open table in an hour. As a third example, the user may learn that their favorite hair stylist, based upon the user's history and stylist ratings, has a time slot available and that the salon has a special offer on services that day.

The user can select from the recommended offerings, or over ride the recommendations and select an offering which is not recommended. The history—feedback module tracks the user's selection and the accompanying circumstance for future use in analyzing offerings. The selected offering can be communicated to the provider. The user's device can pass user account information to the provider along with the desired selection. No PII or user payment information need be passed from the device to the provider's system. The user's order can be processed and received. When no selection is made from the recommended offerings, no order is placed. In an embodiment, the user may interact with the device to request different selections by changing the preferences or filtering options applied to the current offerings. In this embodiment, new recommendations are made after applying the new preferences to filtering the offerings. The new recommendations are passed to the device for review by the user.

In an embodiment, providers broadcast their current product and/or service offerings. Users can access the broadcasts while remaining anonymous, by interacting with a gateway element. The gateway element can include a wifi access point, a quick-response (QR) code to be scanned by the user, or a near-field-communications (nfc) tag. The user interacts with the gateway element by linking to the wifi, scanning the QR code, or using the nfc contact. The user's device then pulls all or part of the provider's current offerings from the provider's system using a wireless connection. In one embodiment, the user's device pulls only those offerings related to a current needs list. In one embodiment, the user's device pulls all current offerings from the provider's system. The user can define preferences for what is pulled. The preferences can be specific to a particular provider, (pull all offerings from Salon X), generalized to a type of provider, (pull all hair salon offerings), or generalized to all providers. (For example: pull all clearance or sale items for consideration, regardless of category.) Preferences can specify categories of interest. (For example, clothing types, colors, and size preferences to avoid a recommendation of clothing which will not fit the user.) In an embodiment, preferences can be stored as part of a user profile.

In an embodiment, providers broadcast their current product and/or service offerings. Users can access the broadcasts while remaining anonymous, by interacting with a gateway element. The gateway element can include a wifi access point, a quick-response (QR) code to be scanned by the user, or a near-field-communications (nfc) tag. The user interacts with the gateway element by linking to the wifi, scanning the QR code, or using the nfc contact. The interaction includes passing a generic identifier associated with the use of an application to the broadcast service. The device acquires an address for the virtual location of a provider's catalog of offerings. The address is passed to the user's personal edge cloud resources. The resources retrieve relevant offerings directly from the virtual location and process them according to the user's profile including current needs lists, user preferences, etc. Recommendations based upon the current offerings are presented to the user on the device. Offerings selected by the user are ordered, either directly from the device or by the edge cloud resources.

Figure 1:
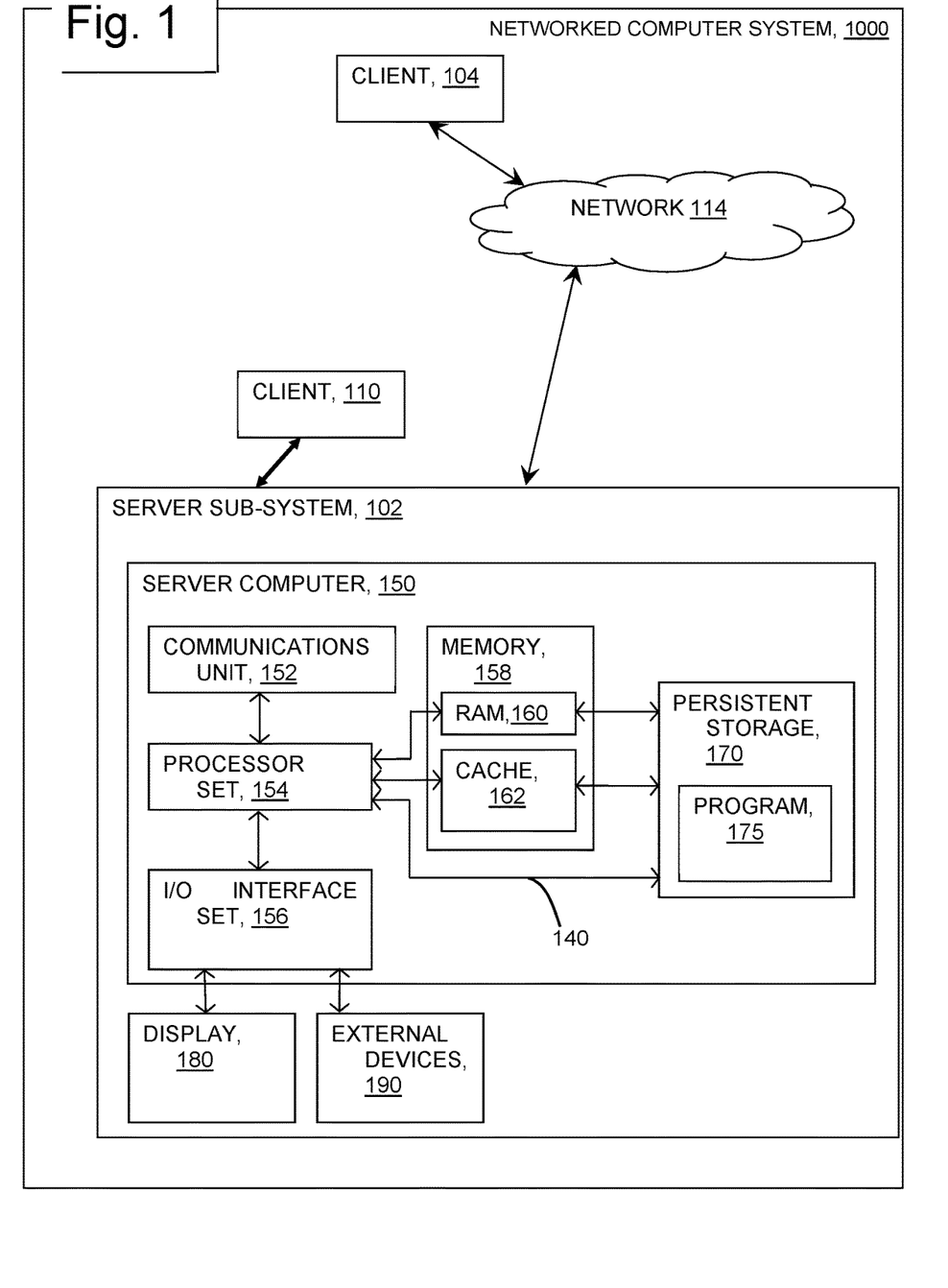
FIG. 1 provides a schematic illustration of a system, according to an embodiment of the invention.

FIG. 1 provides a schematic illustration of exemplary network resources associated with practicing the disclosed inventions. The inventions may be practiced in the systems and processors of any of the disclosed elements which process an instruction stream. As shown in the figure, a networked Client device 110 connects wirelessly to edge cloud resources, such as server sub-system 102. Client device 104 connects wirelessly to edge cloud resources, such as server sub-system 102, via network 114. Client devices 104 and 110 comprise client application program (not shown) together with sufficient computing resources (processor, memory, network communications hardware) to execute the client program. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the machine learning program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., machine learning program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
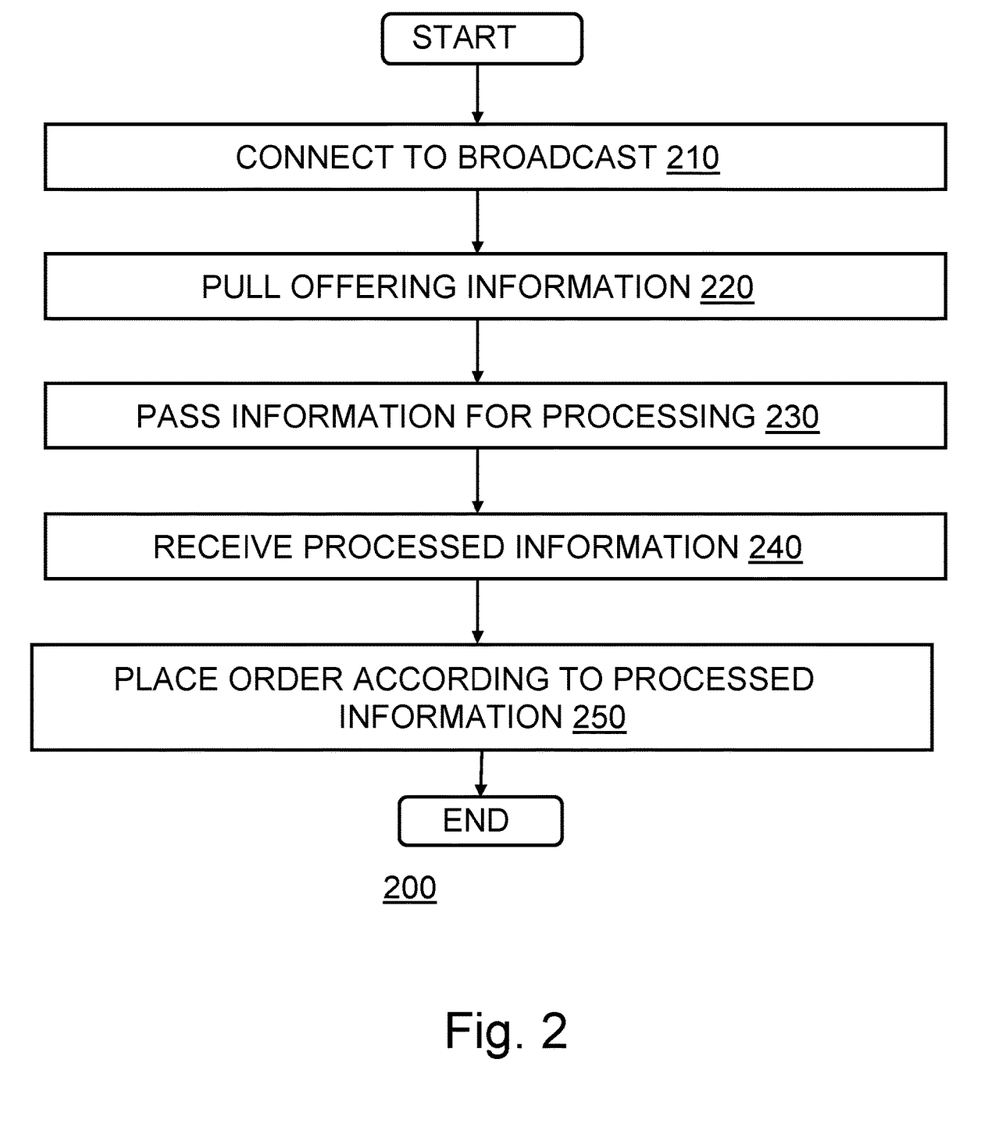
FIG. 2 provides a flowchart depicting an operational sequence, according to an embodiment of the invention.

FIG. 2 provides a flowchart 200, illustrating exemplary activities associated with the practice of the disclosure. After program start, at 210 a user device, such as items 104 and 110, of FIG. 1, engages a broadcast service. The processor set of the device utilizes the communications unit to connect to the broadcast service at a published network address. The broadcast service provides access to the product/service offerings of a provider. In an embodiment, each provider has a distinct broadcast service with catalog offerings residing at a provider-specific virtual location. In an embodiment, multiple providers can share a single broadcast service enabling a user to access the offerings of all the providers from a single location. As an example, a geographic area with a number or providers may offer those providers a single broadcast service to afford users easier, single point access to the respective offerings of the collection of providers. In an embodiment, the connection can be anonymous where no identifying information is passed to the broadcast service. The interaction is strictly a pulling of data from the service by either the user's device or the user's edge cloud service. In an embodiment, the device may pass information indicating the use of a cloud data filtering application, enabling the providers to track participation in the use of the application, but preserving the privacy of the user.

At 220, the processor set of the device pulls information from the provider's broadcast service offerings using the device's communications unit. The device may pull all offering information, or only those offerings relevant in terms of a user profile including current needs list, user history, and defined user preferences. The device may pull the offering data directly or point a user's personal edge cloud resources to the broadcast service such that the resources select and pull relevant offering information.

At 230, the device passes the pulled information to the analysis—filtering module of the edge cloud resources such as server sub-system 102 of FIG. 1, for processing by way of the communications unit of the device. The analysis-filtering module, of the edge cloud resources, processes the pulled offerings and filters them in terms of the user's profile including current needs list entries and user preferences on behalf and under the control of the user. The analysis-filter module then passes filtered results to the recommendation module (not shown). The recommendation module ranks the filtered results according to user preferences which can include, offering price, availability, item details, provider details, etc. At 240, the user's device receives the processing results from the edge cloud resources for display. The device's processor set interacts with the edge cloud using the communications unit and then outputs the received processing results to the device display.

In an embodiment, the user selects a ranked offering and places an order at 250. The user views the results via the device display and interacts with the program running on the processors set by way of a touchscreen, microphone, or external keyboard to provide input to the program about the desired order. The order is placed by interacting with the provider's order handling system. The interaction may be between the device and system or between the cloud resources and the system. The relevant communications unit interacts with the order handling network interface of the chosen provider to send the details of the order for processing by the providers order handling system. User account information associated with the provider is used to link to the order handling system and order the offering for delivery or on-premise pick up. In this embodiment, no personal identifying information or payment information needs to be exposed to complete the transaction. The provider's order handling system may be linked to the provider's broadcast system or may be distinct from that system.

Figure 3:
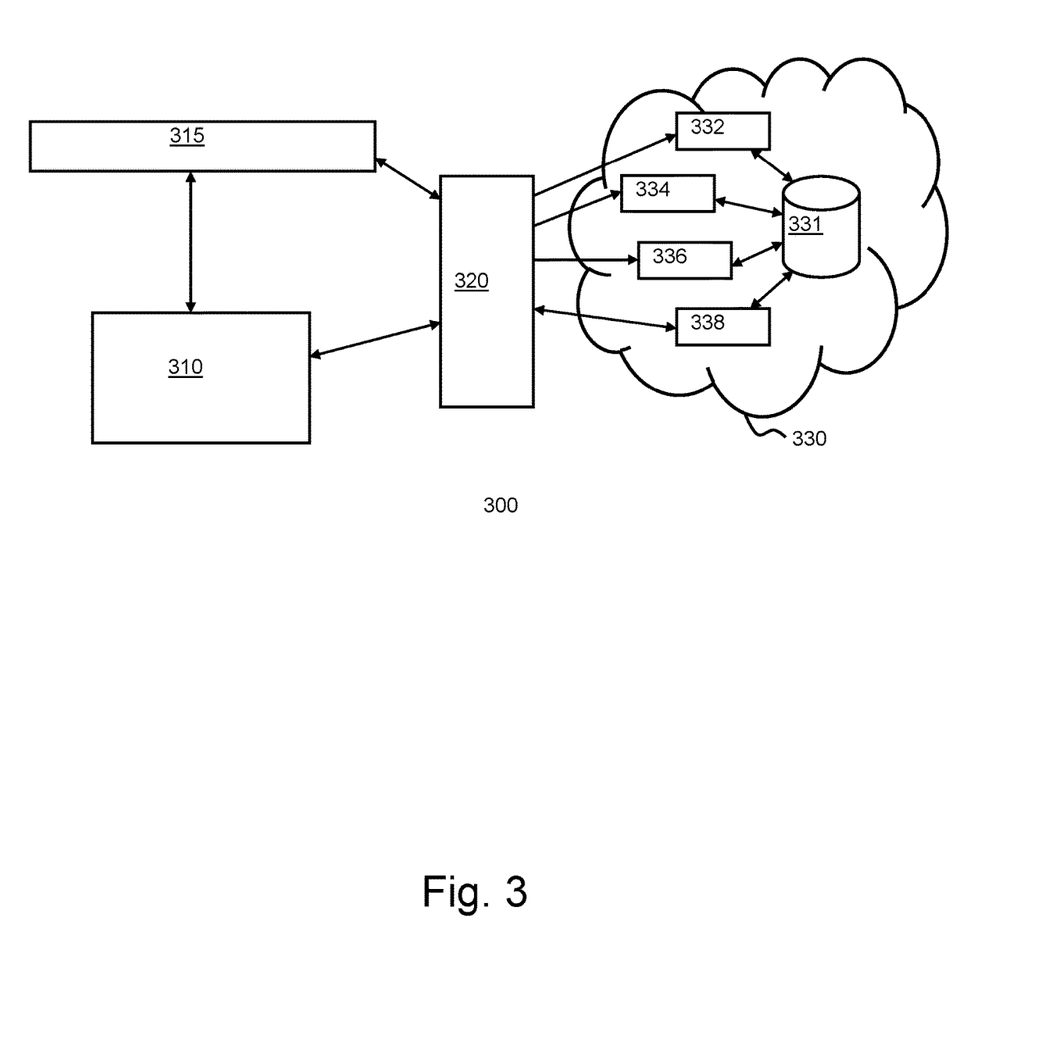
FIG. 3 provides a schematic illustration of system architecture, according to an embodiment of the invention.

FIG. 3 provides a schematic illustration of system architecture 300 according to an embodiment of the invention. As shown in the figure, provider 310, uses broadcast service 315 to make their catalog of products/services accessible by users. User device 320, interacts with the broadcasts service 315 anonymously. User device 320 can comprise a smart phone running a client portion of the overall application. The client portion interacts with the edge cloud resources as well as with provider broadcast services 315.

Device 320 retrieves information from broadcast service 315 and passes the information to edge cloud resources 330. Edge cloud resources 330, include a database 331, history—feedback module 332, connection module 334, analysis—filter module 336, and recommendation module 338, which each interact with user device 320. In an embodiment, the modules interact with the device by way of a common communications module (not shown).

The system passes recommended offerings to device 320 from recommendation module 338. The system orders user selections from provider 310 either directly, or via the provider's broadcast service 315. Selection may be ordered directly by device 320, or by edge resources 330. In an embodiment, the user can set a preference to automatically order recommended selection satisfying a defined set of other user preferences, (for example, any item in a particular category, of a selected brand, in a defined size and color at a defined discount level should be automatically ordered, or a reservation should be made on certain days—birthdays, anniversaries, at a defined restaurant during a defined time window, as soon as the restaurant allows reservation for that date and time window). The order/reservation can be made by either the user device 320, or the edge cloud resources (not shown).

Figure 4:
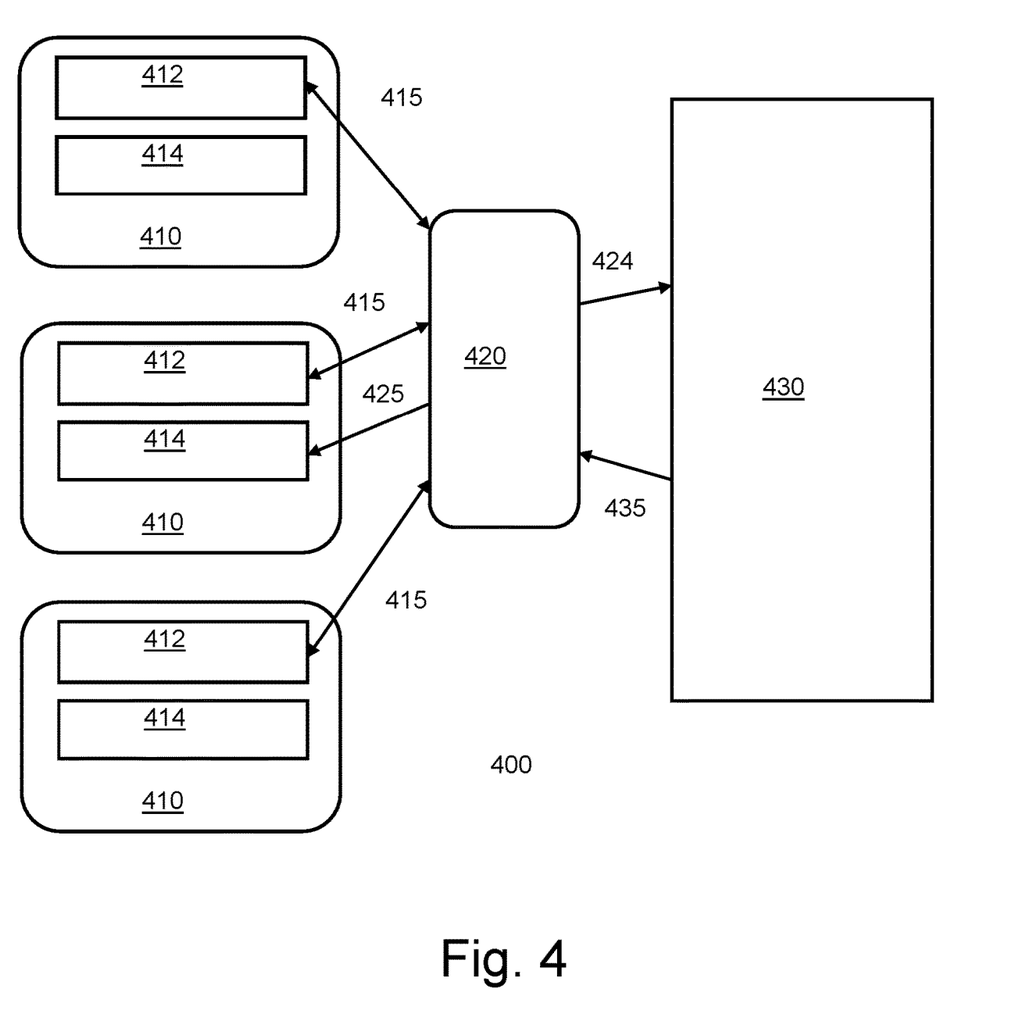
FIG. 4 provides a schematic illustration of system interactions, according to an embodiment of the invention.

FIG. 4 provides a schematic illustration 400, of information flow according to an embodiment of the invention. Multiple providers, 410, each offer their catalog through individual broadcast services 412. A user's device 420 connects to the individual services and retrieves relevant offering information from each provider 410 as indicated by reference 415. The retrieved information is passed to the user's personal edge cloud resources 430, as indicated by reference 424 where the information is analyzed, filtered and recommendation are formed based upon the user's profile including the user's history, preferences, current selections, needs list, and product/service information available from the internet. Recommendations are then passed back to the user's device 420, as indicated by reference 435. Orders are passed from device 420 to the selected provider's order handling system 414, as indicated by reference 425.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
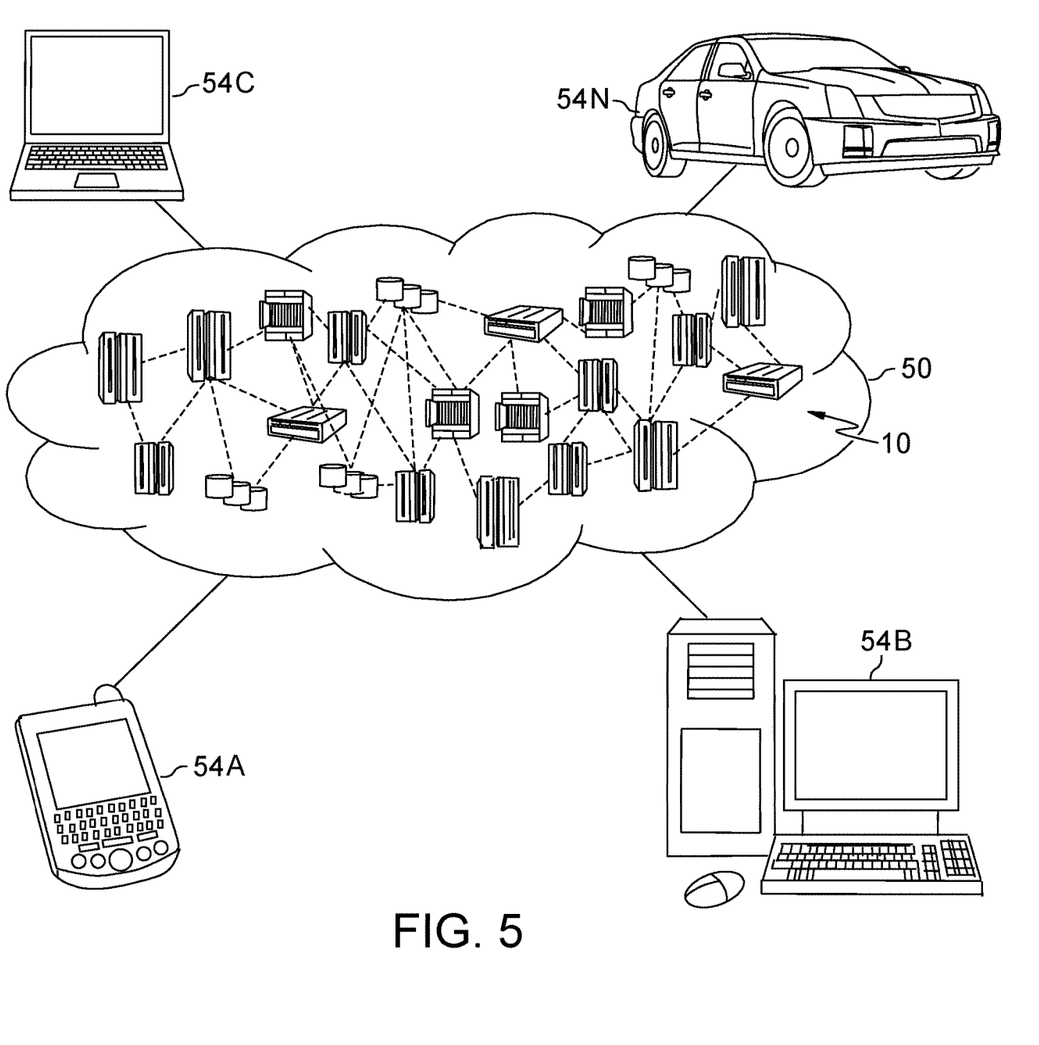
FIG. 5 depicts a cloud computing environment, according to an embodiment of the invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
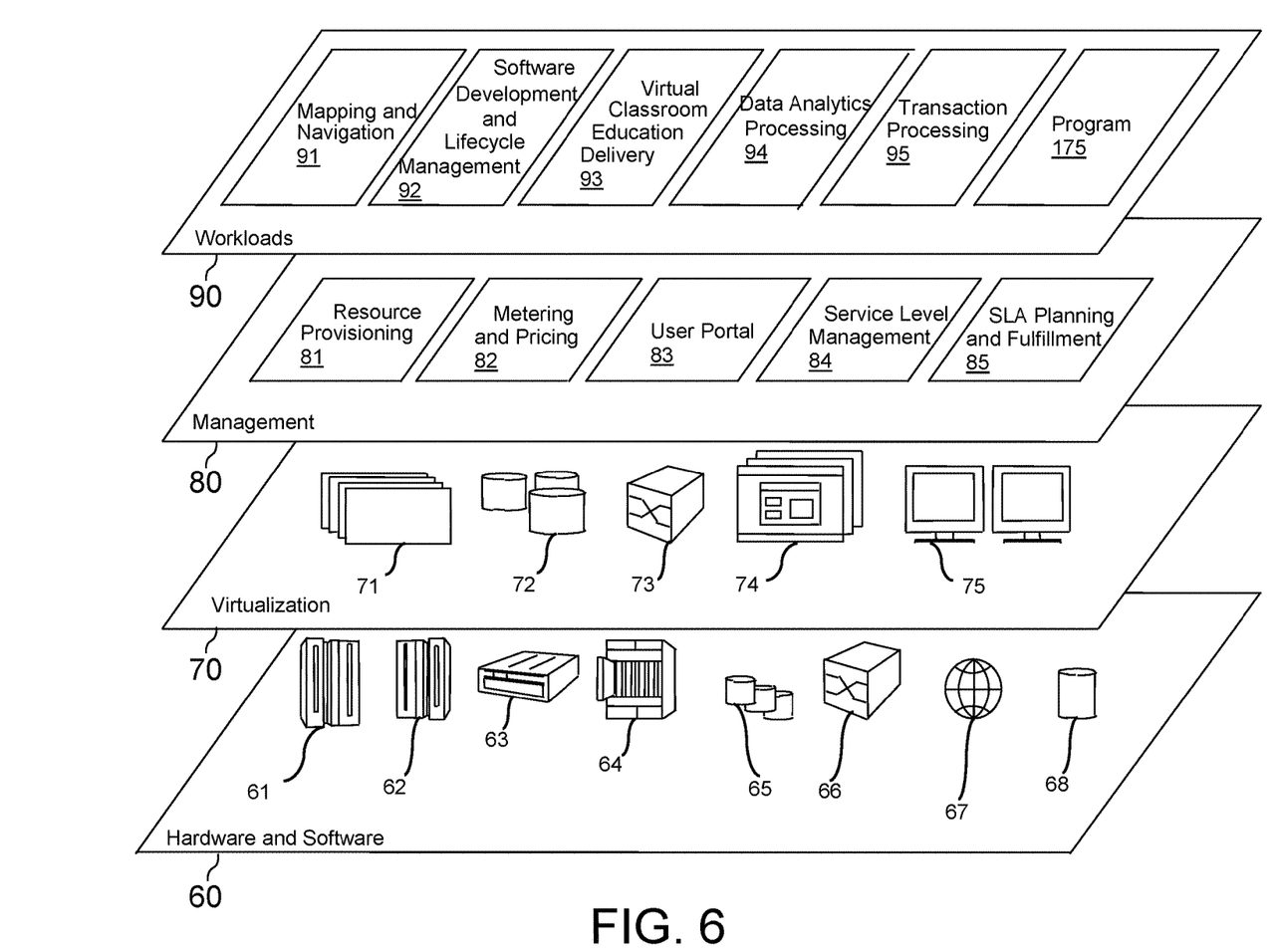
FIG. 6 depicts abstraction model layers, according to an embodiment of the invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and machine learning program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for managing network connections, the method comprising:
   connecting, by a computer application, to a first networked information broadcast service;
   pulling, by the computer application, a first set of information from the first networked information broadcast service according to a profile of a user, wherein the computer application passes no identifying information to the first networked information broadcast service prior to pulling the first set of information;
   filtering, by the computer application, the first set of information according to the profile of the user;
   ranking, by the computer application, the first set of information according to the profile of the user;
   sending, by the computer application using a networked communication service, an information set including the filtered and the ranked information, to a user device;
   responsive to sending the information set, receiving, by the computer application a selection and user account information associated with a provider, from the user device; and
   communicating, by the computer application the selection and the user account information associated with the provider, to the provider using a second networked information broadcast service.

2. The computer implemented method according to claim 1, wherein engaging the first networked information broadcast service is wireless.

3. The computer implemented method according to claim 1, further comprising:
   receiving, by the computer application, the first set of information according to a defined set of information needs.

4. The computer implemented method according to claim 1, wherein the profile includes information from connection history with multiple providers, or user preferences.

5. The computer implemented method according to claim 1, wherein the first set of information is received from the first networked information broadcast service according to a user's location.

6. A computer program product for managing execution of a single computer application, the computer program product comprising one or more computer readable storage devices and stored program instructions on the one or more computer readable storage devices, the stored program instructions of the single computer application comprising:
   program instructions for connecting to a first networked information broadcast service;
   program instructions for pulling a first set of information from the first networked information broadcast service according to a user profile, wherein the single computer application passes no identifying information to the first networked information broadcast service prior to receiving the first set of information;
   program instructions for filtering the first set of information according to the user profile;
   program instructions to rank the first set of information according to the user profile;
   program instructions for sending, using a networked communication service, an information set including the filtered and ranked information to a user device;
   program instructions for receiving a selection and user account information associated with a provider from the user device in response to sending the information set to the user device; and
   program instructions for communicating the selection and the user account information associated with the provider, to the provider using a second networked information broadcast service.

7. The computer program product according to claim 6, wherein engaging the first networked information broadcast service is wireless.

8. The computer program product according to claim 6, the stored program instructions further comprising:
   receiving the first set of information according to a defined set of information needs.

9. The computer program product according to claim 6, wherein the profile includes information from connection history with multiple providers, and user preferences.

10. The computer program product according to claim 6, wherein the first set of information is received from the first networked information broadcast service according to a user's location.

11. A computer system for managing execution of a single computer application, the computer system comprising:
   one or more computer processors;
   one or more computer readable storage devices; and
   stored program instructions on the one or more computer readable storage devices for execution by the one or more computer processors, the stored program instructions of the single computer application comprising:
      program instructions for connecting to a first networked information broadcast service;
      program instructions for pulling a first set of information from the first networked information broadcast service according to a user profile, wherein the single computer application passes no identifying information to the first networked information broadcast service prior to receiving the first set of information;
      program instructions for filtering the first set of information according to the user profile;
      program instructions to rank the first set of information according to the user profile;
      program instructions for sending, using a networked communication service, an information set including the filtered and the ranked information to a user device;
      program instructions for receiving a selection and user account information associated with a provider from the user device in response to sending the information set to the user device; and
      program instructions for communicating the selection and the user account information associated with the provider, to the provider using a second networked information broadcast service.

12. The computer system according to claim 11, wherein engaging the first networked information broadcast service is wireless.

13. The computer system according to claim 11, the stored program instructions further comprising:
   receiving the first set of information according to a defined set of information needs.

14. The computer system according to claim 11, wherein the profile includes information from connection history with multiple providers, and user preferences.

* * * * *